Sept. 26, 1950     O. K. KELLEY     2,523,766
TANK CROSS DRIVE WITH COOLING SYSTEM
Original Filed April 16, 1945     4 Sheets-Sheet 1
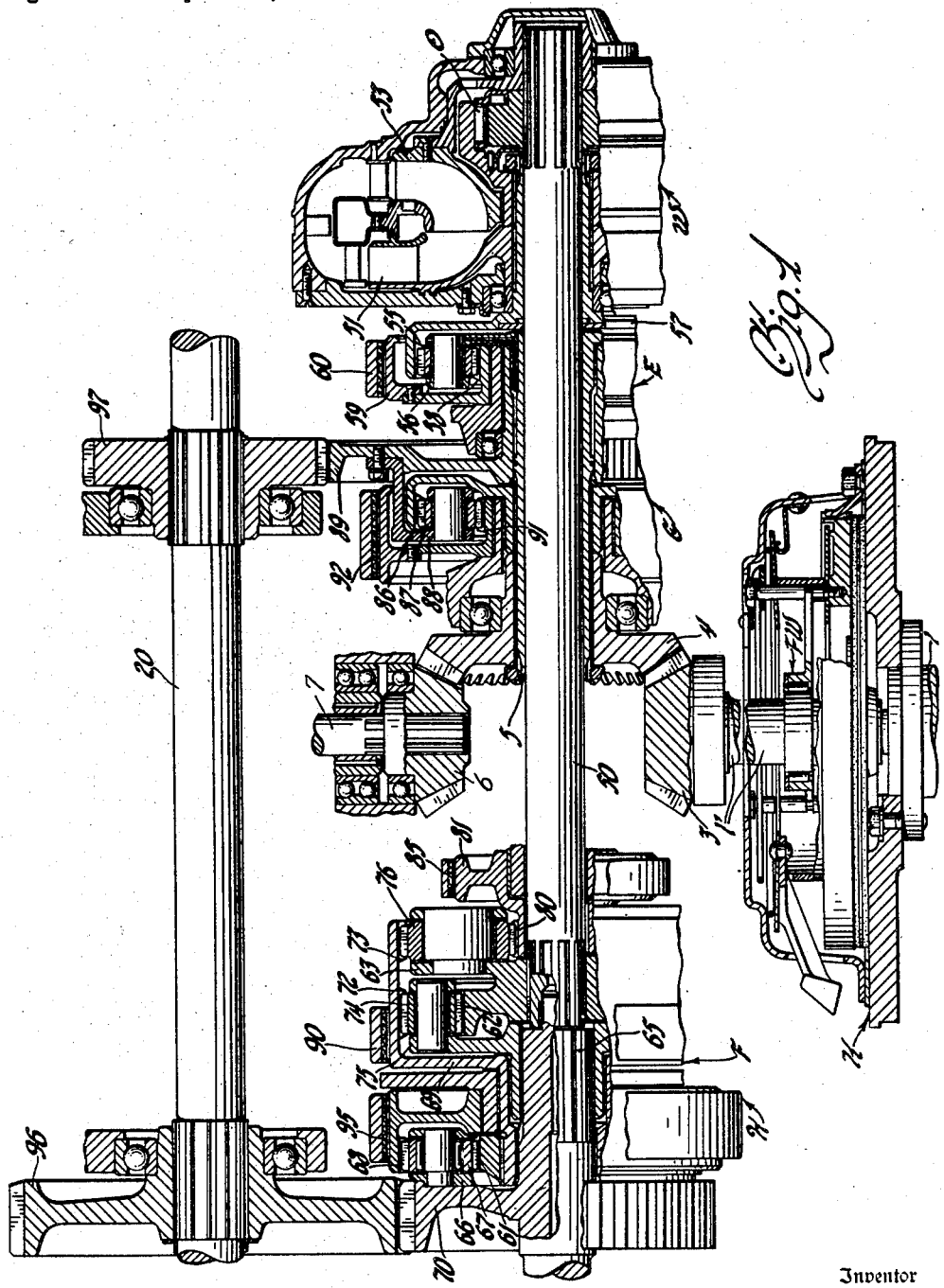

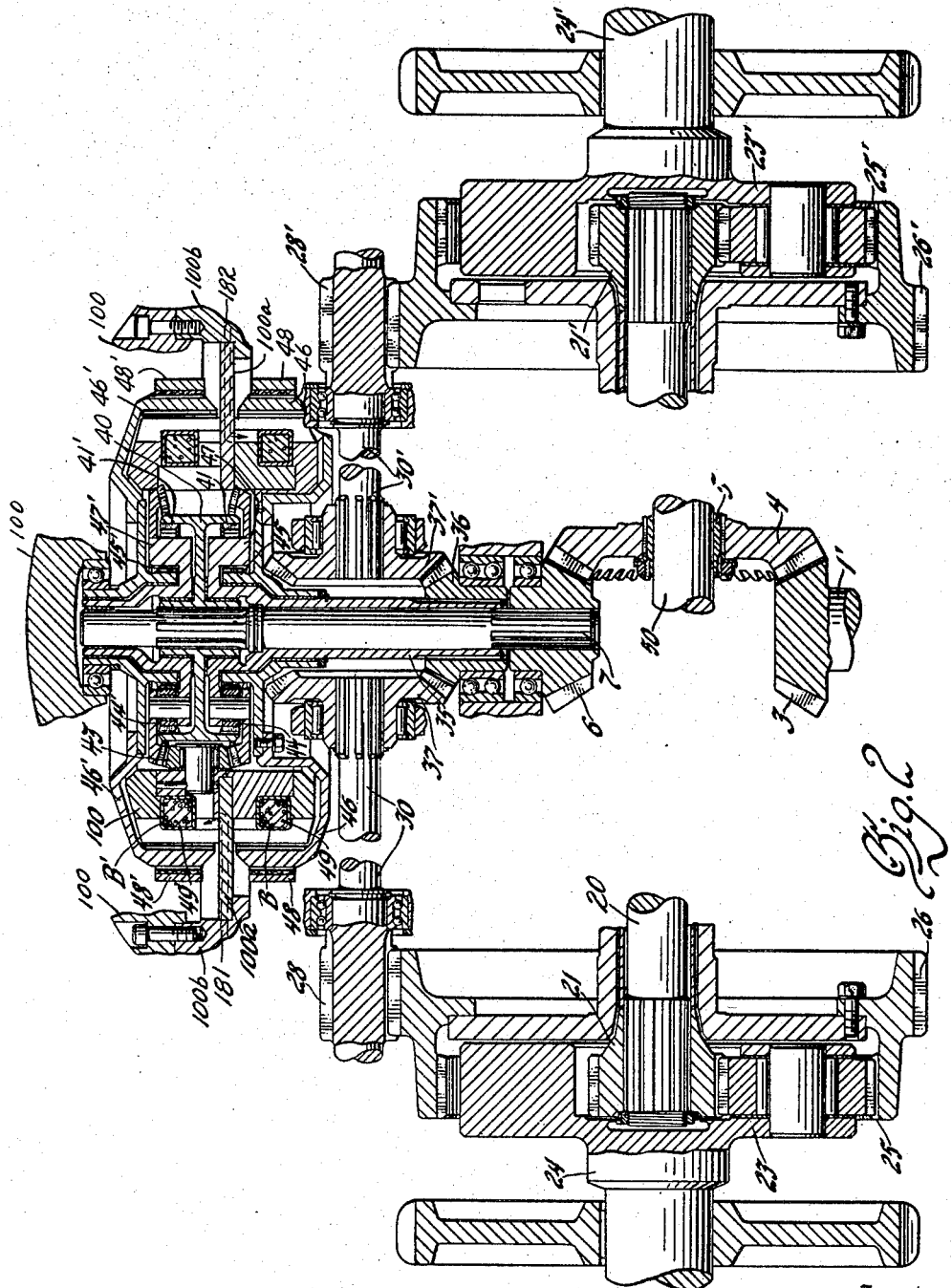

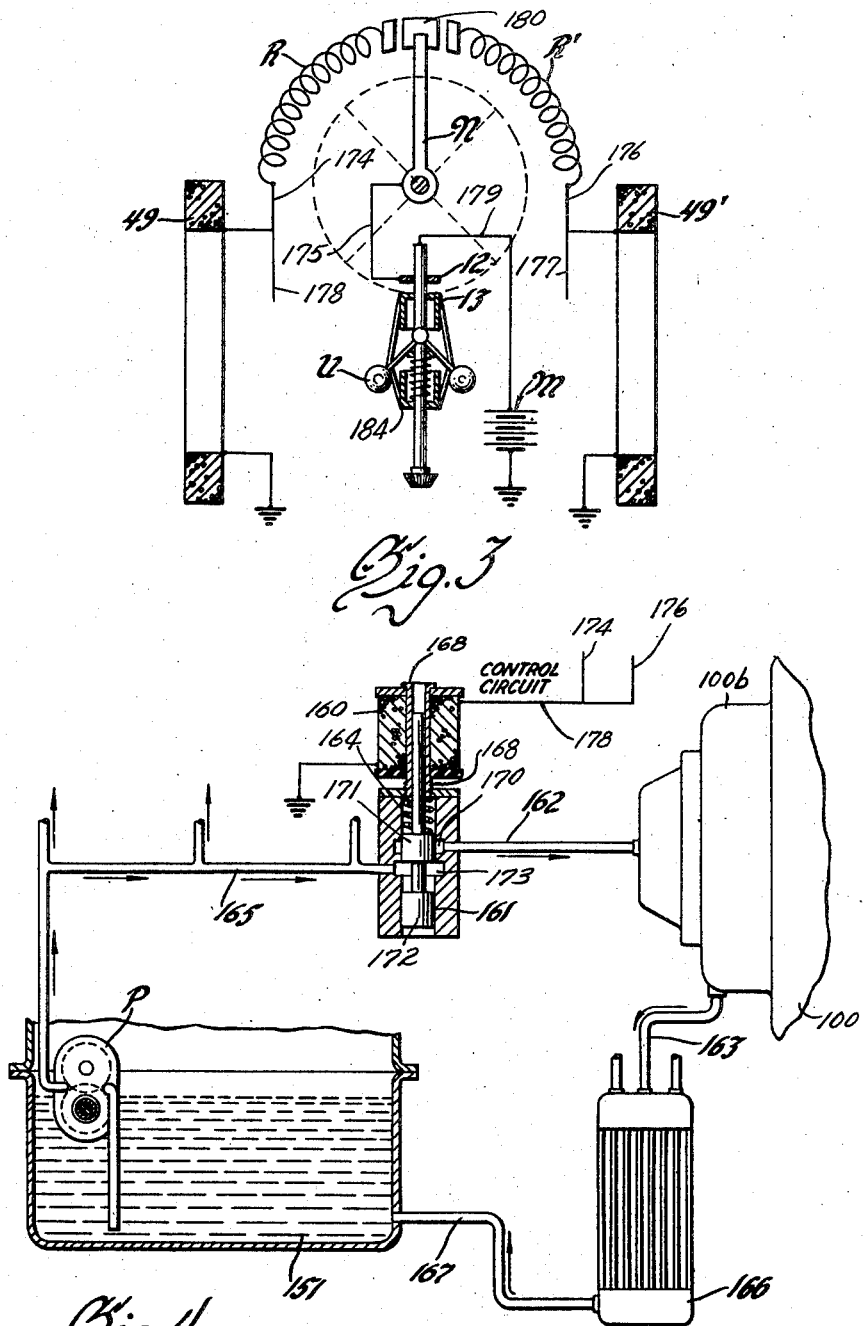

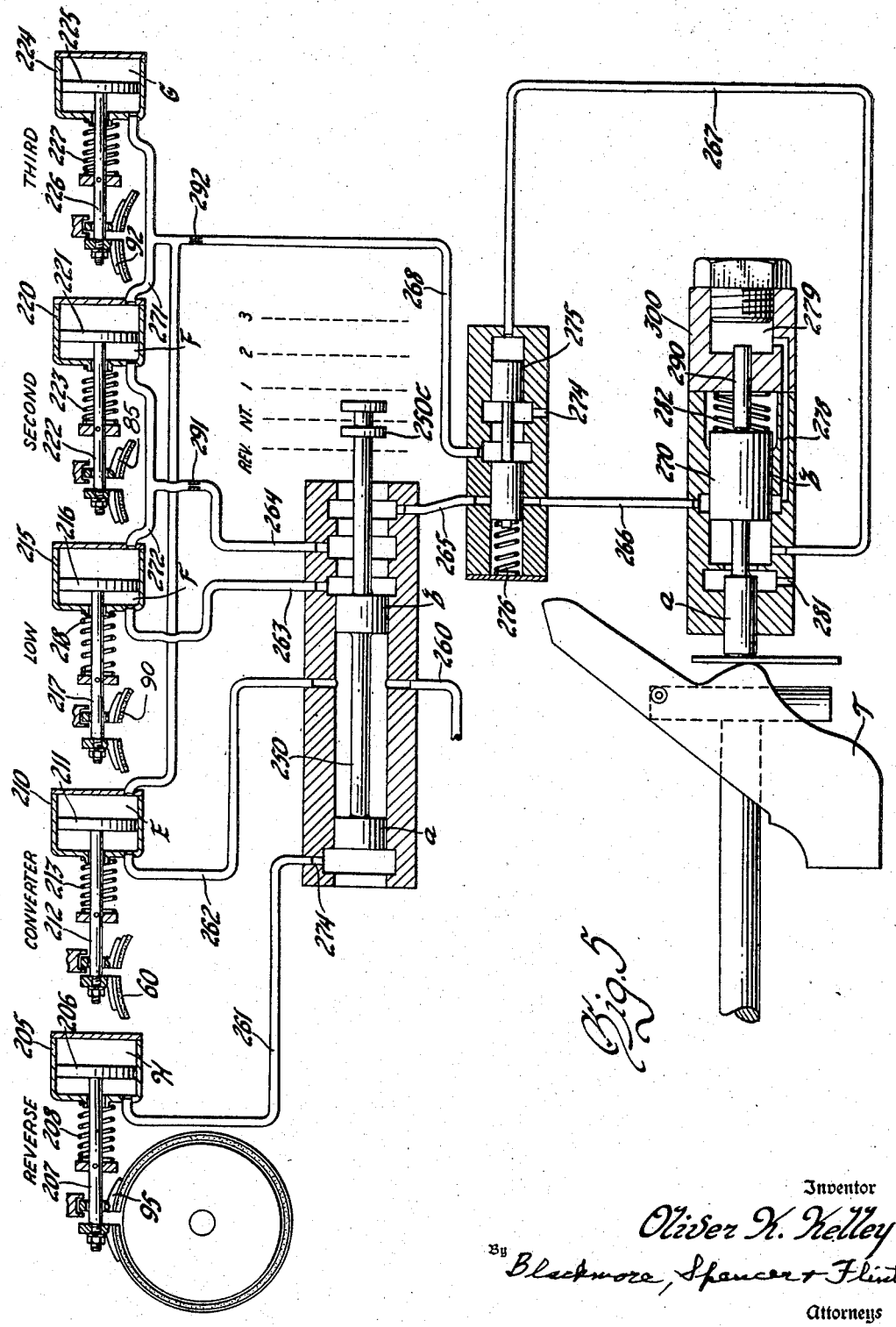

Patented Sept. 26, 1950

2,523,766

UNITED STATES PATENT OFFICE 2,523,766

TANK CROSS DRIVE WITH COOLING SYSTEM

Oliver K. Kelley, Birmingham, Mich., assignor to General Motors Corporation, Detroit, Mich., a corporation of Delaware Original application April 16, 1945, Serial No. 588,475. Divided and this application April 29, 1946, Serial No. 665,816

17 Claims. (Cl. 74—710.5)

The present invention relates to the drive of large heavy vehicles such as military tanks, tractors and the like having track laying mechanism capable of steering by variable speed ratio driving means.

A primary object of the parent application is to provide a common drive for right and left hand track drivers, differentially cross-connected for equalization of torque and speed, and differentially driven by planetary and fluid torque converter units arranged to yield a divided torque combined at the output differential gearing with controlled reactive steering means power driven by the engine.

A further object is to provide a recombined torque at the output differential gearing varying differentially in accordance with the braking reaction applied to a power-delivering differential gear unit driven by the vehicle engine.

A supplementary object is to provide a power transmission for transmitting one power component to the said output differential gearing from said engine at selected variable speed ranges, and a differential driving unit for transmitting a second power component from the engine to said output differential gearing such that the net steering effect is varied in accordance with the driving ratio of the said power transmission, to produce a faster steering effect when the power transmission is driving in low gear than when it is driving in higher speed ratios.

An additional object is to provide a torque dividing and recombining driving mechanism which shall have two primary power transmission means between the engine and the first input members of the said output differential gearing for the right and left drives of the vehicle, the two said means coupling same selectively through planetary gear and fluid torque converter units for one of the primary torque paths, and through planetary gearing for the other of said paths for driving when the said first named path is non-driving.

Another object is to provide a common cross drive connecting both right and left output differential gear units to the outputs of the variable power transmission assembly; and to reversely cross-connect the reaction elements of the said output differential gear units for equalization of both torque and torque reaction in order to establish a self-correcting of torque and speed to stabilize the steering on straight-away driving. The present application is a divisional of application for Letters Patent Serial No. 588,475 filed April 16, 1945 for improvements in "Tank Cross Drive." The objects herein include the subject matter noted above more particularly referred to the combinations believed novel in the operation of the power actuated brakes and the fluid cooling system as will be understood further in detail.

In the customary differentially steered tracklaying vehicle drives, the use of step ratio gearing in the drive to the fixed reaction or clutch types of output gearing has resulted in a harsh and abrupt slewing of the steering mechanism with changes of ratio in the driving gearing, since the torque or torque reactions supported by the clutches or brakes changes suddenly and non-uniformly. This condition has only been ameliorated by softening the clutching or braking action until accuracy of steering has diminished badly and heavy going over rough terrain results in tank drivers losing control, with consequent damage to mechanism and injury to personnel.

Since it is highly desirable that the military track laying vehicle afford a steady gun platform, such vehicles as noted, frequently pitch and jolt so violently that accurate fire beyond 500 yards range is wholly impossible unless the vehicle stops, whereupon it becomes a sitting target.

With the present invention, the dynamic power steering mechanism with differential compensation means affords a finer and more accurate control of motion which corrects for any sudden force which if unrestrained would build up a severe lurching moment, and a steadying effect of automatic ratio correction by the fluid torque converter, even when the power transmission is changed during a steering action, occurs immediately so as to induce a graduated torque variation having a net rate of change of low value, controllable by the operator through manipulation of the engine throttle and the steering wheel.

A coordinating action of torque compensation occurs at the output differential units, between the primary torque provided by the torque converter in all ratios except high gear, and the secondary torque provided by the dynamic steering differential mechanism.

Means are provided to release the engine torque at a given low engine speed, combined with means effective to pick up a stalled engine shaft when the vehicle has motion either forward or reverse.

The automatic, servo operated ratio changing system is supplied by common pump means which assure availability of pressure whenever required, and is coordinately operated with the cooling system as noted above and described in detail below.

These advantages among others, make possible the extension of use of military vehicles so equipped, so that they may operate successfully in rougher terrain than those not so equipped, as will be understood further herein in detail.

Fig. 1 is a schematic representation of the variable power transmission assembly for transmitting the primary torque component to the output differential gearing.

Fig. 2 is a similar view representing the power steering mechanism for transmitting the secondary torque component to the output differential gearing.

Fig. 3 is a wiring diagram for the reaction steering system of Fig. 2.

Fig. 4 is a diagram of the cooling and lubrication system for the brakes.

Fig. 5 is a speed ratio control diagram for the structure shown in Fig. 1.

The diagram of Fig. 1 shows the engine shaft 1 connected by centrifugal clutch K to gear 3 shaft 1' and driving gear 4, and to the power shaft 5 of the variable speed transmission assembly. The rotor 53 of the fluid torque converter W is attached to slide shaft 50 and is the output power member thereof. Impeller 51, is driven from hollow shaft 5, and its drum overhangs into the first planetary unit E, having annular gear teeth 55 meshing with planets 56 spindled on carrier 57 attached to power shaft 5. Reaction sun gear 58 is provided with drum 59 which may be held against rotation by band 60, for driving the impeller at overspeed ratio with respect to the engine driven shaft 5. One way clutch O permits rotor 53 to idle when the converter is relieved of torque, so that the desired steering effect may be maintained on the overrun.

The converter output shaft 50 extends through hollow shaft 5 and gear 4 to the opposite side of the centerline of shaft 1, and has affixed sun gear 62 and carrier 63 as the input power elements for the second planetary unit F. The output shaft 65 of this unit is affixed to large gear 70 and to carrier 66 for planets 67 meshing externally with reaction annulus 68 and internally with input sun gear 62 the drum 69 of which has two groups of annular teeth 72 and 73. The annulus 72 meshes with planets 74 of carrier 75 affixed to shaft 65, and the carrier 63 mounts planets 76. The annulus 73 meshes with planets 76 of carrier 63 attached to input shaft 50 and the planets 76 mesh with reaction sun gear 80 which is attached to drum 81 braked by band 85 for 2nd speed ratio. The drum 69 is braked by band 90 for low or first speed ratio. The annulus 68 is braked by band 95 for reverse gear drive.

The planetary unit G has input annulus gear 86 attached to shaft 50 and meshing with planets 87 of output carrier 88 attached to gear 89, and reaction sun gear 91 is braked by band 92.

The cross shaft 20 is shown also in Fig. 2, is equipped with gear 96 meshing with output gear 70 of planetary unit F, and gear 97 meshing with output gear 89 of unit G.

It will be noted that unit G transmits engine torque independently of units E, F, or W, whereas units E, W and F, drive in series with gear 96 of shaft 20.

For neutral drive, the band 60 of unit E is applied to drum 59 and the other reaction brakes 95, 85 and 92 are released. The torque converter may then rotate shaft 50 if the engine throttle is advanced, but no power be delivered to shaft 20.

In low forward, band 60 remains applied, and band 90 of unit F is applied, stopping drum 69 and annulus 72, so that planets 74 roll around, driving carrier 75 and shaft 65 of gear 70 slowly forward, the gear 70 driving gear 96 and shaft 20. This provides a very low ratio forward drive for starting the motion of the vehicle, the torque converter ratio range being superimposed on that of unit F.

For 2nd speed ratio band 60 remains applied, band 90 of unit F is released and band 85 applied to provide reaction by sun gear 80. In this speed ratio unit F yields a compound forward ratio derived from the ratio gears 73—76—80 superimposed upon that of gears 72—74—62.

The highest gear ratio is obtained through unit G, by releasing band 60, 90 or 85, and applying band 90 to establish torque reaction by sun gear 91, to provide reduction drive through the gearing alone. In this ratio, there is a positive, invariable mechanical ratio of drive whereas in low and second, the torque converter in series with unit F gives two reduction ratio ranges. For normal, fast cross-country driving this will be the most used ratio, and the torque converter may idle, along with the trains of unit F.

In reverse, band 60 is applied and band 95 of reverse unit H. This stops annulus 68 while gear 70 and shaft 65 are driven at a compounded reverse ratio derived from the ratio of gears 72—74—62 subtracted from that of gears 68—67. Sun gear 61 is driven by drum 69. The load on carrier 66 with annulus 68 stopped creates a couple between sun gear 61 of unit H and annulus 72 of unit F, while carriers 66 and 75 are coupled by shaft 65.

The resultant component rotates carrier 66 and gear 70 backwards.

The gear arrangement of groups F and H for compounding for forward and reverse ratios is believed novel. It will be noted that gear group 72—74—62 is utilized in the compounded 2nd speed ratio as well as in the reverse compound drive with unit H, both of which are driving ratio ranges automatically varied by the torque converter W, and by the initial overspeed ratio of unit E.

In Fig. 2 the engine shaft 1 drives bevel gear 3 meshing with bevel gear 4 of shaft 5 which is the input shaft of the power transmission assembly. Shaft 20 is driven by the gearing shown, and is attached to the input sun gears 21 and 21' of the sprocket gear units, for delivering the primary torque component thereto.

Each sprocket gear unit consists of differential planetary gearing, input sun gears 21 and 21', output carriers 23 and 23' affixed respectively to the laterally disposed sprocket wheel shafts 24 and 24'. The annulus gears 25 and 25' serve as variable reaction control members for each of the units, as will be understood further.

The bevel gear 6 of shaft 7 is driven reversely at engine speed by gear 4.

The annulus gears 25 and 25' are toothed externally at 26 and 26' to mesh with gears 28 and 28' respectively, of shafts 30 and 30'.

Sleeve 35 rotates freely about shaft 7 and has affixed bevel gear 36 meshing with bevel gears 37 and 37' affixed respectively to shafts 30 and 30'.

The variable reaction control gear unit consists of a double differential arrangement with the annulus drum 40 attached to shaft 7 as the power member, and the sleeve 35 as the load resultant, or driven member.

Planet gears 44 and 44' mesh with annuli 41 and 41' and with sun gears 45 and 45' respectively.

The engine power provides the second torque component through the gears 3, 4, 6 to the steering input power shaft 7 connected to the double annulus gear 41—41', meshing with the planets 44—44', which normally spin on their spindles in the carriers 47 and 47'. The sun gears 45 and 45' rotate reversely to drum 40, with their drums 46 and 46'. Carriers 47—47' are toothed to mesh with bevel gear 43 pivoted on the casing 100.

The electric brakes B and B' act upon drums 46 and 46' for steering and braking. Auxiliary bands 48 and 48' are used for parking the vehicle, and should the electric system fail to function, they are used to brake drums 46 and 46' for steering and braking.

Without energization, the planets 44—44', sun gears 45—45' and drums 46 and 46' idle, but when a drum is retarded, for example drum 46, the sun gear 45 will be restrained from further idling, and the carrier 47 will be driven, where before, it was standing still, and forces sleeve 35 and bevel gear 36 to rotate thus causing bevel gears 37—37' to revolve in opposite directions. This rotation is transmitted by shafts 30—30' and gears 28—28' to the annulus gears 25—25' of the respective sprocket gear units, which rotate reversely to each other. This causes the unit ouput carrier 23—23' and sprocket shafts 24—24' to revolve at different speeds, hence a steering of the vehicle is achieved by differential divided and recombined torque.

If however, drum 47 is freely rotatable and the drum 47' is braked, sun gear 45' is retarded, and the bevel gear 43 reverses the hand of rotation of carrier 47 and sleeve 35, which reverses the relative rotation hands of shafts 30—30', so that the annulus 25 which had been as rotating clockwise when viewed from beyond the carrier 23 at shaft 24 now rotates counterclockwise.

The braking of drum 47 may steer the vehicle to the driver's right and of drum 47' cause steering to his left. The drums 46 and 46' are actually subject to heat from braking effects derived from the electric brakes B and B' and from the application of bands 48 and 48' therefore the cooling system described further in connection with Figs. 3 and 4 provides relief of excess heat obtaining from both external and internal applications, as will be understood further.

With both sets of brakes released, B and B', the cross-connecting gearing 36—37—37' between the shafts 30—30' with the annulus gears 25—25 acts as a self-equalizing reaction differential, and the connected elements 25—25', 28—28', 30—30', 37—37', gear 36, sleeve 35, and carriers 47 and 47' stand still except for minor hunting caused by variations in tractive effort resulting from the driving conditions.

This is because of the connecting of their reaction members through the gears 37—37' and 36. Under differential traction, this gearing divides the tractive effort, which results in rotation of sleeve 35 and the carriers 47 and 47'.

It occurs that the vehicle may be operating under conditions or gradients which cause differential traction, therefore the driver may correct any tendency for the vehicle to wander from course, by merely braking the drums 46 or 46', as required to restore it to the proper line of motion, and hold it there.

While the entire engine power is delivered by the sun gears 21—21' when drive is straight ahead, as soon as either brake B or B' is applied, a component of engine power derived from bevel gear 6 and shaft 7 is applied to the annulus gears 25 and 25', so that under unbalanced steering conditions, the torque is divided proportionally to the magnitude of the braking of drums 46 or 46'. At full braking of either drum, the annulus gears 25—25' as shown in the figures herewith revolve at ratios with respect to the speeds of the sun gears 21—21', so that the sprocket shafts revolve reversely at the same speeds, consequently the vehicle pivots about its own center, to right or left depending upon the application of brake B or B'.

The steering mechanism being directly driven by the engine from gear 6 and shaft 7, the steering effect as rate of change of vehicle direction is in accordance with engine, and not vehicle speed, therefore in low gear drive by the power transmission, a faster turn will be made than in high gear ratio, for the same engine speed, providing automatic limitation of turning radius inversely to the variable speed drive ratio.

It is provided that if the vehicle requires turning in a restricted space, the engine may be throttled below the speed at which torque is transmitted by the power transmission, the steering wheel may be turned so as to fully brake either of B or B', and the throttle then advanced to execute the turn on the vehicle center, being then retarded to halt the spinning motion.

The web 100a of the casing 100 supports the electric brake field coils 49 and 49' located radially inward of the drums 46 and 46', and supports the spindles of bevel gears 43.

Since under straight forward motion of the vehicle the drums are spinning, conditions are preset for quick generation of retarding force when field coils are excited by closing of their external feed circuits.

Actual experience with this device has been obtained with a 24 volt system providing 32 amperes, controlled by a double rheostat with a null current center section for straight steering, and graduated current control departing therefrom proportional to steering angle, so that maximum retardation of the drums at full current occurs.

The circuit diagram of Fig. 3 shows battery M connected to the steering switch arm N movable over rheostats R and R', each connected to field coils 49 and 49' for left and right hand braking reaction energization respectively, the resistances being diminished with steering angle.

The power servocircuit shown in Fig. 3 has the battery circuit feed to the steering contactor passing through contacts 12 and 13 maintained by governor U at above a given engine speed, and opened when the governor falls below that speed. This feature serves the purpose of prevention of unintentional course movement of the vehicle by steering when the engine may be idling.

With a small torque value on the output unit sun gears 21, 21 and cross shaft 20, actuation of one of the reaction brakes 46, 46' of the power steering unit would provide a combined variable torque component on the sprocket shafts 24, 24' compounded from the two sources, but with minor reaction braking effect so that the vehicle would move in course, rather than pivot on its own center.

The governor U by withholding servocurrent from either winding 49 or 49' at below a given engine speed permits the steering control to be set in sharp steering position without actuation of the reaction brakes, so that advancing the engine speed by throttle to a given torque point permits the power steering unit and the cross shaft to react to drive one track backward at the same speed as the other drives forward. The centrifugal clutch K of the drive diagram of Fig. 1, cuts out the drive to cross shaft 20 so that whatever rotation is delivered by the power steering unit through the compensating gear to the annulus gears has no fulcrum for driving carriers 23, 23′, until engine speed engages centrifugal clutch K. Governor U may be rotated by a driving connection from one of the shafts 30, 30′ or 24. The centrifugal clutch may be of common form such as is shown for example, in Letters Patent U. S. 2,162,873 to W. S. Wolfram, issued June 20, 1938. The clutch couples shafts 1 and 1′ at a given speed of shaft 1, releasing them at a somewhat lower speed as is common in such devices. The freewheel clutch FW is arranged to permit the flywheel-connected parts to rotate freely during all normal forward drive, but to prevent shaft 1′ from rotating forward faster than shaft 1. As will be understood, the vehicle may be towed to start a stalled engine, provided the drive train is adapted to deliver overtaking torque from the sprocket shafts 24—24′ to shaft 1′.

The diagram of Fig. 4 shows a preferred method to remove excess braking heat. A fluid reservoir 151 is connected to the suction of a circulating pump P which maintains oil pressure for lubrication and servo means required in the vehicle. The braking current circuit when energized, opens valve 161 in the pump pressure line 165, which feeds to line 162 delivering the pressure to the brake drum space, from whence it flows by passage 163 to cooler 166, and by passage 167 to the reservoir 151. This method prevents unnecessary withdrawal of oil from the other utilities, except when needed for lubricating and cooling the electrically energized brake drums and produces instant cooling of the oil upon the energization of the braking circuit. This feature permits powerful braking of large heavy vehicles and is adapted in drives for military tanks, to absorb horsepowers ranging from 1,000 to 2,000 or more, in accordance with the drive needs.

Operation of Fig. 4 with the control of Fig. 3 is now described.

Valve 161 is normally held down by spring 164 seated by collar 168. Boss 171 blocks outlet port 170 connected to line 162, and balanced pressure between bosses 171 and 172 in port 173 is ready to deliver from inlet line 165 whenever port 170 is exposed.

Rise of governor contact 13 to connect element 12 and circuit lead 175 to battery lead 179 feeds current to switch arm N. With N resting on midpoint 180, no current flows.

When the steering wheel shown in dashed line is moved to cause arm N to contact resistance R, for example, current flows in lead 174 to coil 49, returning to battery M thru the ground.

Meanwhile the closing of the governor circuit at 12, 13 has permitted current to be delivered thru R, thru lead 174 and lead 178 to the magnet coil 160 of Fig. 4, for lifting the valve 161 to expose port 170 and feed coolant to line 162 leading to the passages 181 and 182 of the steering brake casing 100, 100a, 100b.

The coolant feed passage 181 of Fig. 2 is connected to the main feed passage 162 of Fig. 4, and passes thru web 100a, opening upward to the space inside drum 46′ between the latter and the adjacent field 100 of the coil 49′. Similarly the coolant feed passage 182 shown at the upper right portion of Fig. 2 leads thru web 100a and opens downward to the similar space inside drum 46 between it and the field 100 of the coil 49. Passages 181 and 182 may connect to passage 162, and it is obvious that if desired, two separate magnet valves such as shown in Fig. 4 may be individually operated, alternately for cooling the steering brakes selectively.

The lead wire 174 from the rheostat R of Fig. 3 is also connected to magnet valve coil lead wire 178 of Fig. 4, and the lead wire 176 from rheostat R′ is connected to the coil thru lead 177. Therefore when either of the braking coils 49 or 49′ are energised by the steering motion of control arm N, the coil 160 is energised, valve 161 is opened and coolant is fed thru passages 162, 181 and 182 to cool the drums 46 and 46′ of Fig. 2. In the event that selective cooling of one drum at a time is desired, it is not deemed invention to duplicate the above-described disclosure, where found needful.

It should be observed that the cooling requirement for the steering brakes B and B′ is graduated by the degree of steering angle expressed in angular displacement of the steering control arm N. Sudden sharp steering applies full steering braking and also delivers sufficient current to coil 160 to open the port 170 of valve 161 fully and hold same open. Minor steering motions of short duration cause delivery of lesser coolant volume to line 162. The flooding of the casing sections 100, 100a, 100b with coolant at other than desired intervals tends to disturb the calculated smoothness of the control, because of fluid turbulence in the brake compartment, therefore a proportionalizing flow control as described above, is effective in a predetermined ratio to the degree of braking, and cut off occurs when the graduating effect is no longer needed. It is believed of further novelty to arrange the braking and cooling controls so that the breaking of governor contacts 12, 13 at a low speed point likewise interrupts the cooling flow with braking circuit interruption. Otherwise the turbulence effect could cause irregular drag and steering wander at a time when the vehicle may be in a critical operating position. Exactness of the controls is highly desirable. When the emergency steering and parking brakes 48 and 48′ are used, the construction shown here may be connected in the same manner as above described, to energise the circuit of Fig. 4, utilizing the principles above taught.

The diagram of Fig. 5 shows the servo operating system for controlling the driving speed ratios of the power transmission assembly of Fig. 1.

The five servo actuators for the reaction brakes 95, 60, 85, 90 and 92 are shown in order from left to right, of the shift sequence.

The motion of the servo pistons to the right is to apply the bands, and to the left to release them.

The servo cylinder 205 houses piston 206; the rod 207 of which is loaded by spring 208 to release the reverse band 95. The springs 213, 218, 223, and 227 perform the same function for rods 212, 217, 222 and 226 of pistons 211, 216, 221, and 225 in the cylinders 210, 215, 220 and 224 respectively.

The master valve 250 is formed to deliver fluid pressure from the pump main 260 between its end bosses $a$ and $b$. It has five positions marked from left to right "Rev.," "Nt," "1," "2," and "3," corresponding to reverse, neutral, low, second and high. For the transitions of low to second and second to third, the pressure lines 264 and 268 are branched at 272 and 271 to connect to the cylinders 215 and 220 behind the pistons 216 and 221.

As shown in the figure, pump pressure is being delivered to cylinder 210 to push piston 211 to the right and apply brake 60 of Fig. 1. This is the neutral operating condition, the control boss 250c being entered at "N."

It is not deemed necessary to show the pumping system which feeds servo pressure main 260. The pump P of Fig. 4 may be of very high volumetric capacity, and supply line 260; or any arrangement of pumps may be used which assures servo pressure being available such as shown in Letters Patent U. S. 1,523,648 to M. B. Jackson issued January 20, 1925, this disclosure providing pressure if the engine is running; or if not, when the vehicle is in motion. The pump P of Fig. 4, if so used, for example may be driven by auxiliary electric motor or auxiliary combustion engine power, as is customary in large railcars, airliners, and in marine installations for auxiliary power supply. The only safeguard is that the power be always available when needed to operate the pump and supply the system.

Shift of valve 250 one step to the right from "N" to "1," retains pressure in cylinder 210 to hold brake 60 of unit E applied, while delivering pressure to cylinder 215 to shift piston 216 to the right to apply brake 90 of unit F for drive in low gear.

The next valve step retains pressure in cylinders 210 and 215, holding band 60 of unit E locked, but since the rear face of piston 216 of cylinder 215 is cross-connected to the brake applying pressure in cylinder 220 for the piston 221 which applies brake 85 for 2nd speed ratio, the admission of pump pressure to the rear of cylinder 215 equalizes the pressure on piston 216 of cylinder 215 so that spring 218 may retract piston 216 to the left and release brake 90 of unit F, while the 2nd speed brake 90 is being applied.

The shift of valve 250 to its full rightward position releases the pressure in from cylinder 210 to release brake 60 of unit E, and the equalized pressure in cylinder 215 is retained to keep band 90 released.

The mechanical governor T driven from shaft 5 of Fig. 2 is mounted to control the positioning of a valve 270 which in turn controls the action of valve 275 located in the path of fluid connection between the outlet of valve 250 at line 265 leading by line 268 to the cylinder 224 for causing piston 225 to apply brake 92 of unit G for high gear drive.

The pressure in line 268 is delivered also to passage 271 leading to the rear face of piston 221 in cylinder 220, to equalize the pressure therein and release brake 85 of unit F, and also to the rear face of piston 211 to equalize the pressure so that spring 213 may release brake 60 of unit E.

It is useful to recapitulate the drive reaction control pattern for the required ratios of this demonstration, for convenience in study of the fluid pressure control system of Fig. 5, Preceding, we learned that the reaction brakes were actuated for the reverse to high as follows:

|       | Unit H, Brake | Unit F, Brake 90 | Brake 85 | Unit G, Brake 92 | Unit E, Brake 60 |
|-------|---------------|------------------|----------|------------------|------------------|
| Rev   | x             | 0                | 0        | 0                | x                |
| Neut  | 0             | 0                | 0        | 0                | x                |
| Low   | 0             | x                | 0        | 0                | x                |
| 2nd   | 0             | 0                | x        | 0                | x                |
| High  | 0             | 0                | 0        | x                | 0                |

The x indicates brake application.

For all forward driving, brake 60 is applied for the two lowest, and released for the highest ratio, and the brakes 90, 85 and 92 are applied in succession for upshift. It will be observed that in all except high, the gear torque reactions are divided between two brakes.

Clarifying further, the following pattern of fluid pressure delivery from pump line 260 occurs:

*Passages*

|       | Rev. | Conv. | Low | 2nd | High |
|-------|------|-------|-----|-----|------|
|       | 261  | 262   | 263 | 264 | 268  |
| Rev   | X    | X     |     |     |      |
| Neut  |      | X     |     |     |      |
| Low   |      | X     | X   |     |      |
| 2nd   |      | X     | (X) | X   |      |
| High  |      | (X)   | (X) | (X) | X    |

The X indicates pump pressure delivered; the (X) indicates pressure balanced out for unloading the corresponding brake.

This governor arrangement of Fig. 5 is novel in that instead of the ordinary overriding manual control applied to the governor, it constitutes a governor control overriding the manual, serving the purpose of prevention of stalling the engine, overloading the drive, and permitting the driver to devote his attention to other duties, in handling the vehicle. The governor action by automatically shifting ratio down likewise improves the steering effect, diminishing the turning radius for a given steering wheel angle setting from normal.

By this, the operator need not concern himself with ordinary cross country operation, since it is only necessary after getting the vehicle into motion, to put the valve in "3" position and forget it, the governor action plus the automatic ratio drive in the fluid torque converter W taking care of the drive ratios needed, other than those determined automatically by the steering control of Figs. 2 and 3.

The mechanical governor T controlling valve 270 by actuation of its boss $a$, has only two effective operating conditions, one in which boss $b$ moves to the right to connect 266—267 while closing off exhaust port 281, and two, as shown in the figure, whence the line 267 is connected to exhaust port 281 and line 266 is shut off.

Spring 276 may hold valve 275 to the right as shown, in which position line 268 is open to exhaust between the valve bosses, and feed line 265 is cut off.

At a given governor speed, the governor T may shift valve 270 to the right against spring 282 and connecting lines 266—267, the resultant pressure in 267 shifting valve 275 to the left, connecting feed line 265 to line 268 while closing off the exhaust port 274.

In this condition equalizing pressure is supplied to cylinders 210 and 220, and actuation pressure to cylinder 224, which releases brakes 60 and 90, applying 92.

Now if the governor speed falls below the desired value for drive in the high gear ratio, the operator's setting of the valve 250 in position "3" for directing pressure to line 265 is annulled by the governor permitting valve 270 to shift to the cut-off position shown. Pressure in space 279 acting on the end of plunger 290, and aided by leakage therefrom to the space into which boss b of valve 270 projects, also tends to hold valve 270 to the left aiding spring 282. The differential areas of bosses a and b may be taken as less than the pressure area of the right end area of boss b, for this feature, if needed.

When line 267 is opened to exhaust at 281, spring 276 shifts valve 275 to the right, opening line 268 to exhaust and shutting 268 off from feed line 265.

This leaves only brake 92 of unit G engaged, for drive in high gear.

The governor valve 270 has two bosses a and b with a pressure space between them, and the valve casing 300 has four openings in order from the left 281 to exhaust; line 267 to relay valve 275; pump pressure line 266; and pressure relief passage 278 to pump pressure line 266. Between the main valve bore and space 279 is a small bore in which plunger 290 slides.

The relay valve 275 has four ports, one a cross passage for feeding pump pressure from line 265 to passage 268 connected through to the high gear cylinder 224, an exhaust port 274, and an end port connected by passage 267 to the outlet of valve 270. The valve 275 is pressed toward the right by spring 276. Restrictions 291, 292 in lines 264 and 268 regulate the permitted rate flow in these lines.

The governor overcontrol system creates an immediate downshift to 2nd speed should the vehicle speed drop below a predetermined mile-per-hour figure, while the valve 250 is in the high or 3rd position; and it is to permit shift from 2nd to 3rd only when the speed of the vehicle has reached a given miles per hour.

This control adds maneuvering facility to the control in that the driver may leave the valve 250 in the highest forward speed ratio setting, and proceed, while the governor takes over the work of shifting back and forth between second and high.

In order to avoid stalling of the engine, overloading of the drive and inadvertent movement of the vehicle in course, caused by steering power applied to the drive, the device may be equipped with the above-described centrifugal clutch K to disconnect the vehicle engine from shaft I of Fig. 1, which clutch may be of common form. The freewheel clutch FW idles during all drive by the engine, but becomes effective to turn over a stalled engine when the vehicle is towed.

There is one advantage derived from the overall dynamic steering system which appears in the maintenance of straight steering by minor corrections at the steering wheel. It should be noted that the brake drums 46, 46' of the power steering unit are constantly spinning when the compensating gear torque reaction is evenly distributed, since the carriers 47, 47' are standing still, and double annulus 41, 41' is engine driven.

The instituting of steering brake effect by the power means, starts the inverse rotation of shafts 30, 30' and annulus driving gears 28, 28' from zero speed, and the addition of the drive component to them therefore builds up from zero so that whatever the torques are at sun gears 21, 21', there is a gradual superposition of the steering component, so gradual that minor direct travel corrections by the steering wheel are made with ease and without shock, and with no release and engagement of clutches having different speeds on their members.

This facility permits full correction for torque differentials on the sprocket shafts 24, 24' induced by difficult terrain, so that the vehicle may actually be steered in a straight line along the curving side of a hill, or with one track in mud, with the other on a better tractive base.

The almost instantaneous response of the power steering device herein avoids uncertainty of control which heretofore has required operators of military vehicles in narrow city streets to take the center, to avoid accidental side-swiping of buildings. A tank, for example, in the middle of a city street is a good artillery target, whereas if it can hug a building line, it is a much poorer target.

The present invention avoids difficulties experienced with prior art construction by utilizing a form of output gear in which the primary sun gears rotate normally in the same direction as the output carriers, so that a simple and gradual variation of reaction annulus rotation is obtained by controlled reaction braking in the power differential unit, applied to the compensating gear. The ability to graduate the steering control permits use of the simple control of Fig. 3.

The presence of the fluid torque converter in the primary path of torque to the cross shaft and output planetary sun gears provides an extremely useful factor in the power steering control, due to the added torque requirement caused by steering from straightaway, which by increasing the torque on the converter, reduces the speed ratio, which in turn increases the steering effect by diminishing the steering radius.

In common tank drives, it is necessary to declutch and shift to a lower power transmission gear ratio, for sharp steering, whereas with the invention herewith, there is an automatic response by the fluid turbine torque converter which leaves the driver free to carry on other duties and focus his attention on the terrain and upon the driving factors.

This effect is enlarged by the action of the governor T shown in Fig. 5 for automatic downshift from high gear at a given low cross shaft speed. Both the torque converter effect and the governor control therefore participate in this augmented sharp steering action which proceeds automatically such that when the degree of steering angle is suddenly increased, the torque converter will normally reduce speed ratio, and if the speed falls off below the limit set for governor T to hold high gear, the valve 275 of Fig. 5 is shifted to release band 92 of the unit G, and engage bands 90 and 60 of unit G, and engage bands 90 and 60 of units F and E.

In actual field tests, the vehicles equipped with this device when sharply steered, turn in a spiral of diminishing radius to a mere spinning about the vehicle center, as for azimuth reconnaisance. Other devices do not provide this automatic steering control effect.

Special advantages in the proper distribution of the torques for handling the heavy reduction load, and in establishing useful ratio ranges in sequence are derived from this gear pattern.

With the spread of ratio factors available in the present invention construction it is possible to operate the fluid torque converter within its most efficient ratio range so that there is a minimum of energy to be disposed of as heat, which adds to the life of the wear surfaces and the lubricant.

The automatic ratio changing response of the fluid torque converter over its effective reduction ratio range is effectively utilized to assist steering as will be understood from the foregoing description.

It is not deemed necessary to repeat the drive operating description given above for the present invention, in that it should be obvious to one skilled in the art how this device is controlled.

Reference has been made in the parent application herewith Serial Number 588,475 to certain selections from the prior art in order to set apart clearly, the present invention from the prior art. It is believed well demonstrated that the advantages set forth in the preliminary paragraphs of this specification are here amply demonstrated.

In the phraseology of the claims herein, the term "heat exchanger" is synonymous with "cooler." Reference to graduated braking covers the variable effect of arm N of Fig. 3 in moving over the rheostat units R and R', which graduation is also effective in the effort supplied to coil 160 of Fig. 4 for raising valve 161 against spring 164. The differential gearing of Fig. 2 for applying the steering force component to the drums 46 and 46' is referred to as a gear train as distinct from the power gear train of Fig. 1 which provides variable speed drive. The claims refer to the single control arm N of Fig. 3 as occupying flanking positions on either side of the inactive mid-point element 180, and to its coincident control of the coolant flow thru the opening and closing of valve 161.

Although the applicant has described one particular physical embodiment of his invention, and explained the operation, the construction, and principles thereof; it should be understood that the form of the invention shown is merely by way of illustration and that other forms utilizing the invention may be designed without departing from the spirit or essential characteristics thereof, the scope of the invention disclosed herein being outlined in the appended claims.

The applicant therefore desires to obtain by Letters Patent the following claimed invention:

1. In motor vehicles, a power drive system including steering mechanism operative under applied driving power, braking means effective to apply forward or reverse retarding motion to steering elements of said mechanism, power means for applying said braking means, a control for said power means operable to graduate the power of said power means in applying said braking means, a fluid cooling system for said braking means including in series circulating passages leading to and from said braking means, a heat exchanger, a reservoir, a pump and a flow controlling valve, and a master controller for the said power means control and said valve effective to initiate the flow of fluid through said system when said braking means is applied by said power means to increase said flow with increase of said power braking action, and effective to block the fluid flow in said system when the said power means is rendered ineffective to apply said braking means.

2. In the art of vehicle motion control, a selective braking mechanism effective to provide forward and reverse drive steering force to movement of a vehicle, fluid pressure power applying means operative upon said mechanism for energising same, control means for said power applying means including valving effective to graduate the effect thereof upon said mechanism, a fluid cooling system including passages connecting same with said mechanism, and a heat exchanger of said system, a reservoir, a servo pump and a flow controlling valve, and a movable controller for said power applying means control also effective upon said valve to initiate fluid flow thru said exchanger, increase said flow with increase of said braking action, or to stop the said flow, in accordance with motion of said controller.

3. In vehicle brakes and controls therefor, the combination of a vehicle brake mechanism, a coolant circulation system for said brake mechanism including a reservoir, a pump feeding therefrom to a coolant space adjacent said mechanism, a heat exchanger unit connected between said space and said reservoir, a valve effective to permit or prevent flow thru said system; controlling apparatus for said mechanism including a device arranged to graduate the degree of braking of said mechanism, and arranged to increase and diminish said braking action, and a common control for said valve and said apparatus operative to provide predetermined actuation of said mechanism with effective accelerated cooling flow permitted by said valve during the increase of said graduated intervals of braking established by said control.

4. In the combination set forth in claim 3, the sub-combination of an electrical circuit connecting the said controlling apparatus and said common control, graduating means included in said device adapted to effect gradual application of said brake mechanism in accordance with movement of said common control and of electrical operating means for said valve, the said circuit being opened and closed by said control.

5. In vehicle controls, the combination of a variable speed power gear train with a steering mechanism arranged to provide selective right and left drive of driven shafts at variable speed ratios obtained thru the agency of power brake members, ratio actuating means for said gear train, brake control apparatus for said members including a single control arm movable from a central inactive position to flanking positions in which latter positions the members are applied gradually in accordance with the degree of motion departing from the central inactive position, a cooling system for said mechanism having a body of coolant liquid included in a flow circuit comprising a reservoir, a pump feeding from the reservoir to flow control valving opening to coolant delivery passages for said mechanism, a cooler having inlet passages connected to said mechanism and outlet passages connected to said reservoir, and control means for said valving operated coincidentally with the movement of said arm to said flanking positions for permitting flow of coolant thru said cooler during either steering braking interval established by said control arm.

6. In a drive and steering assembly for a tread-laying vehicle, having variable speed drive gearing, differential steering gearing combined with said first-named gearing, and having braking mechanism arranged to actuate the forward and reverse drive of said first-named gearing, braking mechanism arranged to control the steering action provided by said second-named gearing, control means for each of said first and second named mechanisms, a movable control device thereof for said second-named mechanism operative between a neutral and flanking positions to provide graduated steering effects in accordance with its motion from said neutral position, a fluid cooling system for said second-named mechanism, coolant-flow control valving for the fluid of said system, and a connection between said valving and said device effective to energise and to graduate the action of said valving means coincidental with the applied steering effect provided by said device, said cooling operation being effective during both forward and reverse drive established by said first-named mechanism.

7. A driving, steering apparatus for a tracklaying vehicle which apparatus includes selectively operable steering brakes energised by individual electrical right-and-left steering windings, one for each brake, an electrical power source operative to maintain current thru a power lead connection and arranged to furnish electrical energy to said windings, a fluid cooling system adapted to circulate coolant for extracting heat from said brakes, an electrical resistance unit connected to said left-steering winding, a similar resistance unit connected to said right-steering unit, a circuit contact arm connected to said electrical power lead and arranged to occupy a neutral position flanked by steering actuation positions in which the arm cuts out successive resistance unit turns when moved from the neutral position for energising one of said windings, valving for controlling the coolant flow interval of said system, electrical valve-controlling means for said valving energised by the establishing of a circuit thru either of said units by said contact arm to enforce coolant flow during the contact positioning of said arm in said steering actuation positions.

8. In the combination set forth in claim 7, the sub-combination of a speed-responsive governor having a movable contact and a fixed contact for interrupting the said power lead connection at low governor speeds and for connecting the said power lead circuit at a predetermined higher speed thereof.

9. In a brake cooling system, a brake drum, braking members, a fluid passage adapted to deliver a coolant stream to the space adjacent said drum, a fluid passage arranged to drain coolant from said space, a constantly rotating pump with a reservoir connected to supply said coolant stream, a cooler unit connecting said coolant draining passage with said reservoir, a flow regulating valve located in the first-named coolant stream passage, a spring normally biasing said valve closed to prevent the supply of said pump from passing to the said space, an electrical device operative to oppose the action of said spring and move the said valve with a varying force for different degrees of valve opening, an electrical power circuit for energising said members including said device and a braking controller contact arm; a resistance unit coacting with said contact arm such that for successive contact positions of said arm on said unit the valve spring is opposed with a force varying with the motion of the said arm, for providing increased braking of said members coincident with increased opening of said valve.

10. In the combination set forth in claim 9, the sub-combination of a vehicle-steering apparatus, of steering actuation means made simultaneously effective by and graduable with the motion of said controller contact arm.

11. In the invention defined by claim 9, the sub-combination of speed-responsive means effective to interrupt the circuit of said power lead connection at a given low speed, for inhibiting the control action of said controller arm.

12. In the invention set forth in claim 9, the sub-combination of a vehicle steering apparatus, of steering actuation means therefor, of control connections operable by said arm for controlling said steering actuation means and of a speed responsive governor for interrupting the circuit of said power lead at a predetermined low speed point of the operation of said governor.

13. In a power steered vehicle having brake mechanism selectively operable for right and left steering effects, the combination of power means for actuating right or left steering actuator members thereof with variable applied steering force, of control means for said power means including a controller effective to initially select the right or left actuator member and thereafter vary the steering force applied to that one of the members initially selected, of a cooling system means adapted to provide controlled cooling for said actuator members, a control device for said cooling system arranged to provide a range of cooling action by said cooling system means between no cooling and full cooling, and a speed-responsive control member connected to initiate the energising of said control means wherein thereafter the said controller is operative to provide variable control of said actuator member selected and of said device over the stated cooling range action.

14. In the combination set forth in claim 5, the sub-combination of electrical circuit connections of said brake control apparatus with said arm, and of said valving control means including a valve and an electrical actuating device for said valve made effective by said connections such that when said arm is moved to apply the said members, the said valve is increasingly opened with the said departure of the said arm from the central inactive position.

15. In the combination set forth in claim 5, the sub-combination of said variable speed power gear train being equipped with drive-establishing elements operative to provide forward and reverse drive of said driven shafts controlled by said ratio actuating means for said gear train, of fluid servo actuators effective to cause selective forward or reverse drive actuation of said elements, and of a servo feed connection from the said pump to passages connected to said actuators, wherein the body of coolant liquid of said circuit is commonly utilized for cooling the said mechanism and for providing fluid pressure to said actuators.

16. In a power-steered and driven vehicle, the combination of brake mechanism effective to provide selective forward and reverse drive and to provide steering for said vehicle, a variable speed power gear train combined with a differential steering gear train both of said trains being controllable by said mechanism, actuators for said mechanism one group of which actuates same for providing said forward and reverse drive and a second group for providing said vehicle steering, a fluid pressure supply system for the first of said actuators and fluid flow control valves for selective delivery of fluid pressure of said system to said group, an oil body circulating in said system, a fluid pressure pump, a cooling circuit of said system including a feed connection from said pump, a steering brake chamber, a cooler, a sump for said pump and a valve operable coincidentally with the said actuators for said steering group to circulate a portion of said oil body thru said system cooling circuit.

17. In the combination set forth in claim 16, the sub-combination of said control valves for said first group actuators being adapted to establish either forward or reverse drive by said power gear train, and of said valve operated coincidentally with the said steering group actuators to be effective upon actuation of said steering group actuators to initiate the cooling of said oil body portion during either forward or reverse drive of said vehicle.

OLIVER K. KELLEY.

REFERENCES CITED

The following references are of record in the file of this patent:

UNITED STATES PATENTS

| Number | Name | Date |
|---|---|---|
| 1,688,643 | Murfey et al. | Oct. 23, 1928 |
| 1,926,692 | Tarbox | Sept. 12, 1933 |
| 2,355,484 | Teker | Aug. 8, 1944 |
| 2,384,182 | Lewis | Sept. 4, 1945 |

FOREIGN PATENTS

| Number | Country | Date |
|---|---|---|
| 312,527 | Great Britain | May 30, 1929 |